United States Patent

[11] 3,548,091

[72] Inventor Walter H. Bockwoldt
Woodland Hills, Calif.

[21] Appl. No. 653,864
[22] Filed July 17, 1967
[45] Patented Dec. 15, 1970

[73] Assignee Hughes Aircraft Company
Culver City, Calif.
a corporation of Delaware

[54] SYNCHRONIZER FOR COLOR TELEVISION
2 Claims, 12 Drawing Figs.

[52] U.S. Cl. 178/5.4, 178/6.6
[51] Int. Cl. H04n 9/42
[50] Field of Search 178/5.4(2), 5.4CR, 5.4S, 5.4Sync, 6.6A

[56] References Cited

UNITED STATES PATENTS

| | | | |
|---|---|---|---|
| 2,739,181 | 3/1956 | Sleeper | 178/5.4(S) |
| 2,969,425 | 1/1961 | Hughes | 178/5.4C |
| 2,993,086 | 7/1961 | DeFrance | 178/5.4S |
| 3,162,838 | 12/1964 | Sauvanet | 178/5.4S |
| 3,255,303 | 6/1966 | Kihara | 178/6.6A |
| 3,267,208 | 8/1966 | Brouard | 178/5.4S |

*Primary Examiner*—Richard Murray
*Assistant Examiner*—Joseph A. Orsino, Jr.
*Attorney*—James K. Haskell and Robert Thompson

ABSTRACT: A television-recording system including a color selector switch operable to alternately conduct a red (R–y) color signal and a blue (B–y) color signal on a line-by-line basis for recording on a single recording track, a circuit for applying an identification signal to one of the two color signals and switch means for receiving played-back color signals for alternately combining the red (R–y) and blue (B–y) color signals with delayed blue (B–y) and red (R–y) color signals, respectively, in a sequence synchronized by detecting the identification signal placed on one of the two signals whereby a red color signal (R–y), a blue color signal (B–y), and a green color signal (G–y) are derived.

INVENTOR.
WALTER H. BOCKWOLDT,
BY
Robert Thompson
ATTORNEY.

SYNCHRONIZER FOR COLOR TELEVISION

This invention relates generally to synchronizing television signals and particularly to synchronization of a recorded color television chrominance signal.

In the television technology, it is sometimes desirable to reduce the bandwidth requirements of a television signal in order to make the signal compatible with the bandwidth limitations of some other medium such as a video tape recorder, while at the same time not seriously affecting the time base stability requirements of the signal. One way to accomplish this result is to take advantage of a fortunate feature in the NTSC color television signal which permits the green color signal (G–Y) to be derived from the red color signal (R–Y) and blue color signal (B–Y). In this regard in copending patent application Ser. No. 563,763 entitled "TELEVISION BANDWIDTH REDUCTION" filed 8 July 1966 by Russell R. Law, a system is disclosed in which video information is sampled and recorded on a select switch pattern such that the red color signal (R–Y) and blue color signal (B–Y) are alternately conducted on a line-by-line basis and are recorded on a single track.

On playback, a decoder is operably coupled to receive the chrominance signals and recombines them in a specific manner to obtain the red color signal (R–Y) and blue color signal (B–Y), blue color signal (B–Y), and a green color signal (G–Y). This recombination takes place in a switch into which the red color signal (R–Y) and the blue color signal (B–Y) are fed directly or without a delay while at the same time red color signal (R–Y) and blue color signal (B–Y) which have been delayed for one horizontal scan line are also fed into the switch and are recombined with the nondelayed blue color signal (B–Y) and red color signal, respectively, to obtain the green color signal (G–Y). In order to obtain the green color signal (G–Y), it is necessary to recombine the red (R–Y) and blue (B–Y) color signal in a fixed synchronized sequence.

Accordingly, an object of this invention is to provide a device for synchronizing the recombination of color television signals.

Another object of this invention is to provide improvements in means and methods for synchronizing line-by-line switching of color television chrominance signal.

Yet another object is to provide means and methods for identifying the chrominance signals in a television signal-recording system.

Other objectives of this invention can be attained with a circuit which modulates the leading or beginning portion of one of the two possible chrominance signals such as the red (R–Y) color signal to provide an identifying mark or wave form such as a notch. On playback, a detector circuit detects this identifying mark and sequences or synchronizes the color decoder switch so that: the nondelayed red color signal (R–Y) is always fed out on a first output channel; the played-back blue color signal (B–Y) is always played back on another output channel; and the green color signal, which is combinations of nondelayed and delayed red color signal (R–Y) and blue color signal (B–Y), is conducted out on the third output channel. With the identifying mark, the probability that the color switch will lose its synchronism and conduct the wrong color signals to the wrong output channels and degrade the color intelligibility of played-back color image is obviated.

Other objects, features, and advantages of this invention will become apparent upon reading the following detailed description of an embodiment and referring to the accompanying drawings in which:

FIG. 1 is a block diagram of a video tape recorder system showing the relationship of a color television receiver, an encoder, a recorder, a decoder, and a synchronizer;

FIGS. 2*a* through 2*c* are graphical illustrations showing a sampling pattern of a portion of the video picture in which individual luminance information bits are illustrated as rectangles with subscripts indicating the sampling sequence and switched chrominance information is illustrated as a wavy line;

Figure 1:
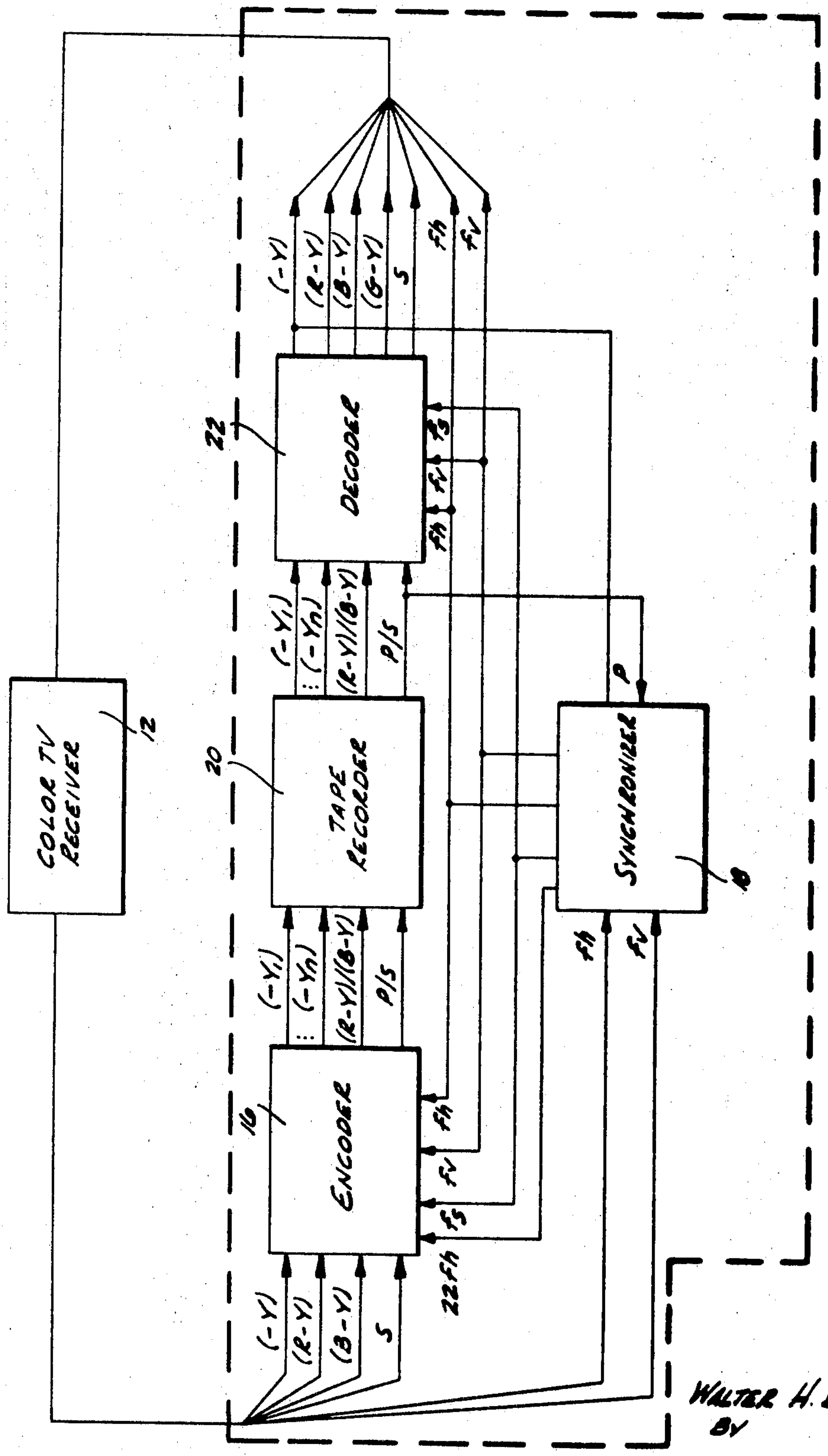

Referring now to the drawings, there is shown in FIG. 1 a color television receiver 12 in combination with a video tape recorder system 14. The video tape recorder system 14 includes an encoder 16 which is coupled to receive the luminance signal (–Y) and the red and blue chrominance signals (R–Y) and (B–Y) from a convenient tap point in the television receiver 12. In operation, the encoder 16 is selectively controlled by output signals from a synchronizer 18 for sampling the luminance signal (–Y) in accordance with the sampling pattern graphically illustrated in FIG. 2*a* and for selectively switching the chrominance signal in accordance with a line-by-line switching pattern graphically illustrated in FIG. 2*b*.

Although the luminance sampling operation is not part of this invention and is described in more detail in the previously referenced copending patent application Ser. No. 563,763, an understanding of the overall operation of the system may be helpful in understanding the invention.

In the encoding mode of operation, the luminance signal (–Y) received by the encoder 16 is sampled in the stable recurring pattern in response to a sample signal derived from the sampling sync signal $f_s$ generated by the synchronizer 18. For example, the sampled luminance signal is fed from the encoder 16 on a plurality of a parallel output channels as sampled luminance date data ($-Y_1$) through ($-Y_n$), where *n* is a number such as 2 or more, to a recorder 20 such as a magnetic tape recorder.

Figure 2A:
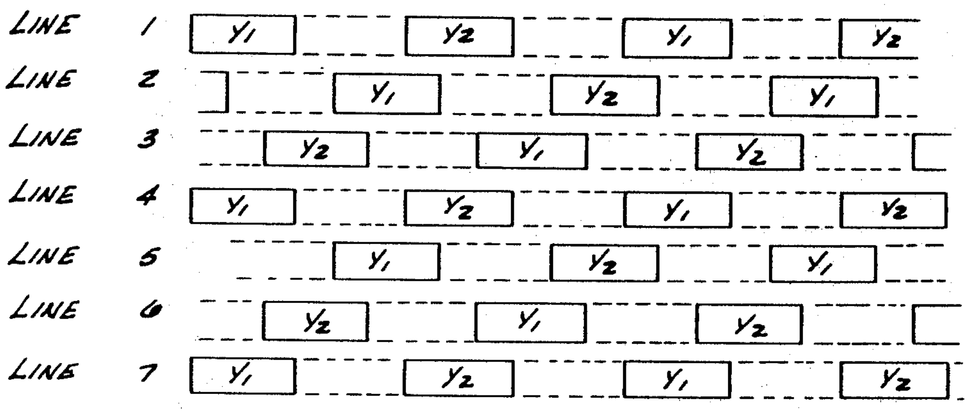
Figure 2B:
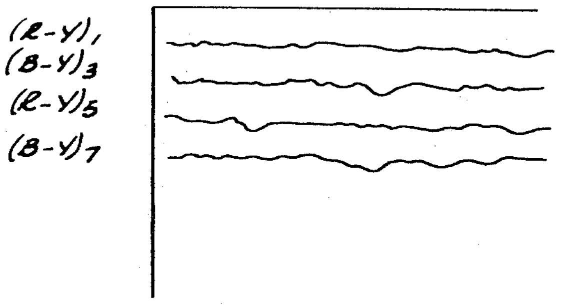

A specific luminance sampling pattern developed by the described circuit graphically illustrated in FIG. 2*a* is representative of a portion of one video picture or frame. In practice, during the odd-numbered fields, select, evenly spaced luminance information areas are sampled in the sequence $Y_1$, $Y_2$, where the subscripts represent the sequence of sampling. For example, each sampled data area is illustrated as a rectangular area containing the reference character $Y_1$ or $Y_2$. There is in one embodiment 40⅓ of these sampled data areas on each video line and the sampling pattern is repeated every three horizontal lines. The encoder, in response to a sample signal derived from the sampling sync signal $f_s$ generated by the synchronizer 18 processes the ($Y_1$) sampled data signals always on a first output channel and the ($Y_2$) sampled data signals on a second parallel output channel.

On playback, the luminance information ($Y_1$) through ($Y_n$) are received by the decoder 22 and are recombined on a single output channel as a composite luminance signal (–Y) in the same order as illustrated in FIG. 2*a* and this composite signal is used to modulate a cathode ray tube in the television receiver 12 in a conventional manner.

The encoder 16 also receives the chrominance signals from the color television receiver 12 and processes them for recording on a single track in the tape recorder 20. Since the NTSC color signal has the advantage that the green signal (G–Y) may be derived from the red signal (R–Y) and the blue signal (B–Y), the green signal (G–Y) is not recorded. In operation, the red signal (R–Y) and the blue signal (B–Y) are applied to the encoder from a convenient tap point in the reciever 12. The encoder alternately selects and conducts the red signal (R–Y) and then the blue signal (B–Y) in a continuous sequence so that the red signal (R–Y) is conducted during every second horizontal video line and the blue signal (B–Y) is conducted during every intermediate horizontal video line therebetween, as graphically illustrated in FIG. 2*b*. This switching from color to color on a line-by-line basis is continued for each field. The selected chrominance information is fed to the recorder 20, where it is recorded on a single track.

Figure 2C:
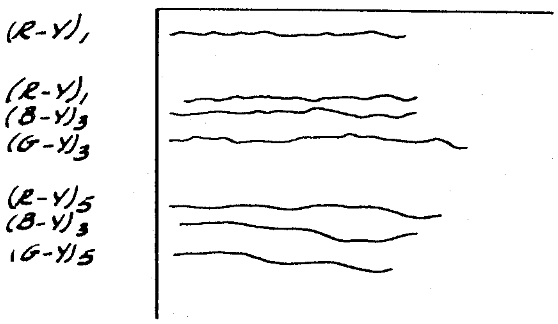

The played-back chrominance signals (R–Y)/(B–Y) are sequentially fed to the decoder 22 and processed in accordance with a switching operation in response to the horizontal sync signal $f_h$ and the vertical sync signal $f_v$ derived from the played-back pilot signal P by the synchronizer 18 to reconstruct the chrominance signal in the manner illustrated in FIG. 2*c*. In operation, the red chrominance signal (R–Y) and the blue chrominance signal (B–Y) are selectively switched within the decoder onto a separate red channel (R–Y), a separate blue channel (B–Y), respectively, and are combined in a manner to be described for recreating a green color signal (G–Y) which is fed onto a separate green channel (G–Y). These processed chrominance signals are fed to modulate the control grid of a color cathode ray tube in the color television receiver 12.

The sound or audio signal S and a clock or pilot signal P are both recorded on the same recording track of recorder 20. In practice, the audio signal S received from the receiver 12 is mixed with the pilot signal P which is derived from the sampling signal $f_s$, thereby forming a combined signal P/S that is recorded on a single recording track within the tape recorder 20. Since the pilot signal P is recorded at fixed tape positions relative to the positions of the recorded luminance information and the recorded chrominance information, the time-base of the recorded video information is stabilized or fixed by the tape itself. As a result, the effects of time-base instability in the recording medium is significantly reduced.

The synchronizer 18, as illustrated in FIG. 1, is coupled to receive a base frequency signal such as the horizontal sync signal $f_h$ (15.75 kHz) during the encoding or recording mode and to receive the played-back clock sync signal P during the decoding or playback mode. The mode of operation of the synchronizer can be selectively switched to provide output signals for the encoding operation or output signals for the decoding operation, as is described in more detail in the previously referenced copending U.S. patent application.

Figure 3:
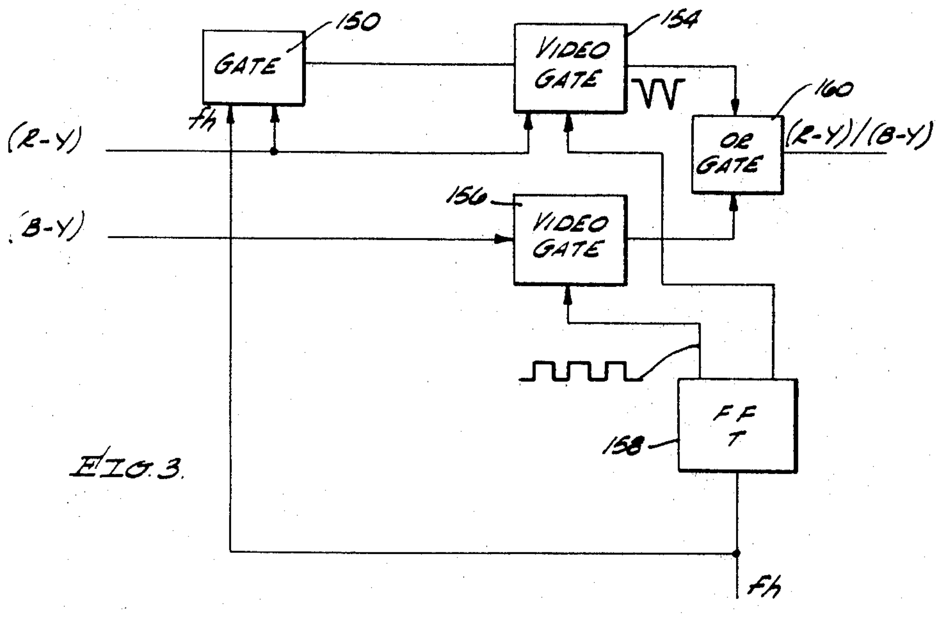
FIG. 3 is a block diagram of the color selector portion of the encoder, including a notch signal generator.

Referring now to the details of the synchronizing portion of the system, which embodies the features of this invention, reference is made to FIG. 3 which is a block diagram of the chrominance-switching portion of the encoder 18.

During the chrominance-switching operation, the circuit illustrated in FIG. 3 is coupled to receive the red color signal (R–Y) and the blue color signal (B–Y) but not the green color signal (G–Y). To specifically distinguish the red signal (R–Y) from the blue signal (B–Y), an identifying mark or notch is taken out of the horizontal sync pulse in the red signal (R–Y) by the operation of an identifying signal generator or, more specifically, a notch signal generator 150 coupled to a video gate 154. The video gate 154 is enabled every other line and conducts the red signal (R–Y) except during the short time interval when the notch signal generator 150 is triggered by the horizontal sync signal $f_h$. During alternate lines the video gate 156 conducts the blue signal (B–Y).

Figure 4:
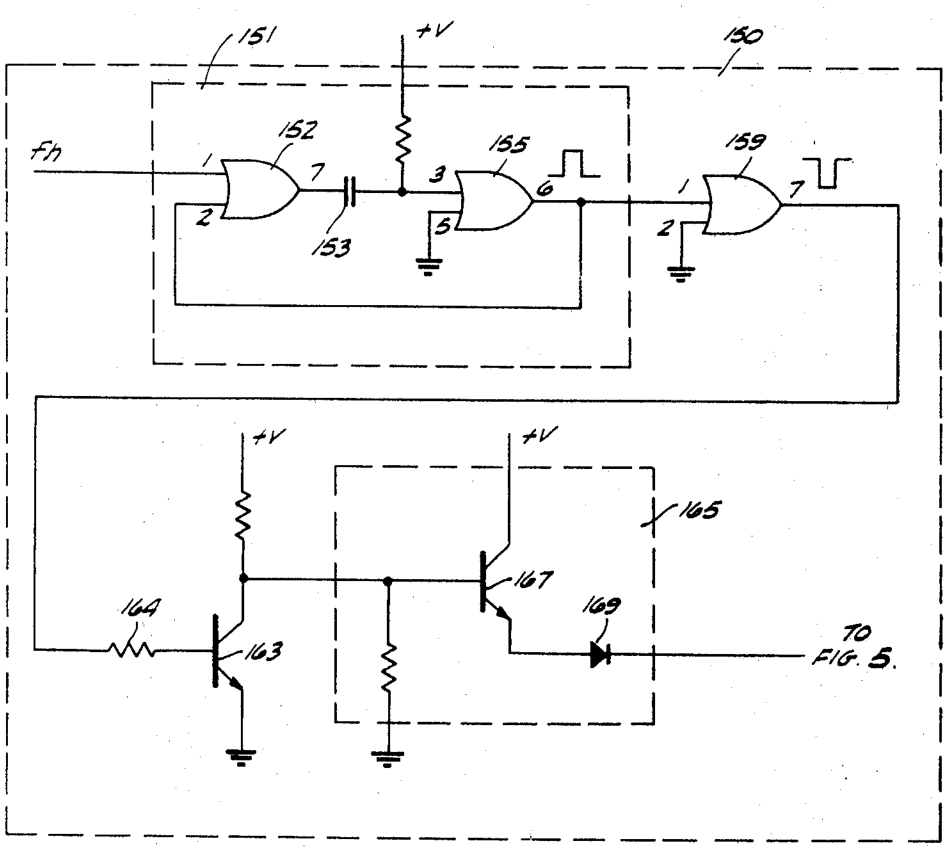
FIG. 4 is a schematic diagram of the notch signal generator in the encoder of FIG. 3.

The notch signal generator 150 is illustrated in more detail in FIG. 4, wherein the horizontal sync signal $f_h$ is fed to a one-shot multivibrator 151 which generates a narrow pulse during the horizontal sync signal $f_h$ duration. The one-shot multivibrator 151 includes a first stage amplifier 152 which is overdriven by the horizontal sync signal $f_h$. The output of the amplifier 152 is fed through an RC charging circuit 153 formed by a series capacitor and a shunt resistor to the input of a second stage amplifier 155 which is overdriven to produce an output pulse. The time constant of the RC charging circuit 153 can be set so that the output pulse duration is short relative to the duration of the horizontal sync pulse $f_h$. In addition, the output from the second stage amplifier 155 is fed back to turn off the first stage amplifier 152. A circuit that will perform this function is a gate such as a "μL–914," manufactured by the Fairchild Semiconductor Co. and described and illustrated in their brochure SL–66, published in Aug. 1965, connected in the manner illustrated.

The output pulse from the one-shot multivibrator 151 is received by a first amplifier stage 159 which can be formed from a previously referenced "μL–914," and then by a second amplifier stage transistor 163. In operation, the square wave pulse is amplified and inverted by the first stage amplifier 159 and is fed to the base terminal of transistor 163 through a resistor 164. The collector current of transistor 163 varies with the base terminal signal wherein the collector signal is applied to a buffer amplifier 165.

The buffer amplifier 165 includes a transistor 167 which is connected to receive the output from amplifier 157 at its base terminal. The change in the base terminal signal results in a change in emitter current flow through diode 169 which is applied to the video gate 154 for taking a notch out of the horizontal sync signal $f_h$ preceding each line of the red signal (R–Y), as will be explained in more detail shortly.

A video gate 154 is coupled to receive the red signal (R–y) and a video gate 156 is coupled to receive the blue signal (B–Y), as illustrated in FIG. 3. The video gates 154 and 156 are alternately enabled by the outputs from flip-flop 158 which is triggered by the horizontal sync signal $f_h$. In operation, the video gate 154 is enabled during one horizontal raster line and the video gate 156 is inhibited. As a result, the red signal (R–Y) is fed through an OR gate 160 to the chrominance recording channel. On the next horizontal raster line, the video gate 156 is enabled and the video gate 154 is inhibited, whereupon the blue signal (B–Y) is fed through the OR gate 160 and is recorded on the chrominance recording track of the tape recorder.

Figure 5:
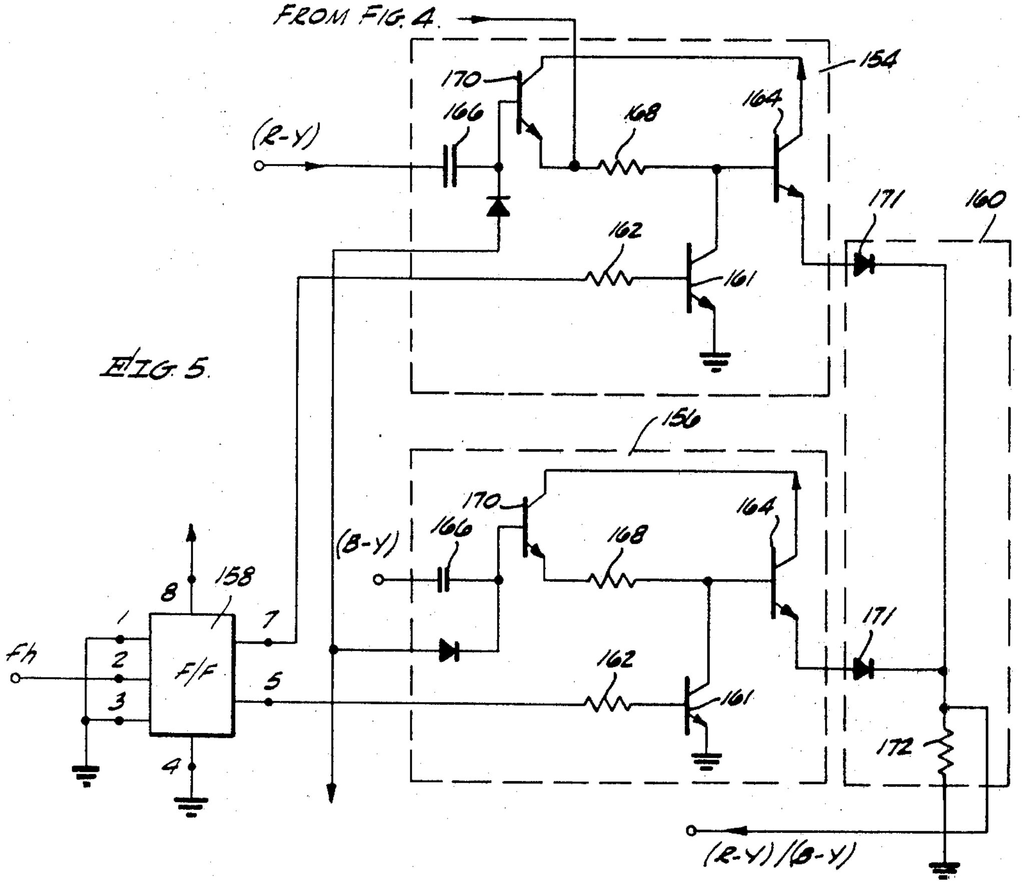
FIG. 5 is a schematic diagram of the video gates and OR gate in the encoder of FIG. 3.

The video gates 154 and 156 are illustrated in more detail in FIG. 5 wherein the outputs from the flip-flop 158 are coupled to the base terminal of a shorting switch transistor 161 through a base resistor 162 in the video gates 154 and 156. In operation, when the JK flip-flop 158, such as a "μL–923" manufactured by the Fairchild Semiconductor Co. and described and illustrated in their brochure dated May, 1965, is triggered or toggled by the horizontal sync signal $f_h$ the output signal on the terminal connection 7 is at a high voltage state and the output on the terminal connection 5 is at a low voltage state relative to one another. As a result, the red signal (R–Y) is inhibited by the video gate 154 and the blue signal (B–Y) is conducted by the video gate 156. More specifically, a high voltage level applied to the base terminal of shorting transistor 161 through a base resistor 162 turns on the transistor 161, whereupon the transistor 164 is base biased off and the output at the emitter terminal remains constant. The low voltage output signal from the flip-flop 158 applied to the base terminal of shorting transistor 161 through the base resistor 162 associated with the video gate 156 is at a low enough level to turn the shorting transistor 161 off. As a result, the blue signal (B–Y) applied to the base terminal of transistor 164 through a coupling capacitor 166, the base emitter terminals of the transistor 170, and a resistor 168 modulates the emitter output of the transistor 164.

The emitter current flow through a diode 171 of OR gate 160 develops a voltage signal across a load resistor 172 which is fed to a recording amplifier in the tape recorder 20. On the next horizontal raster line, the video gate 156 is inhibited and the video gate 154 is enabled to conduct the red signal (R–Y). The red signal (R–Y) is fed to the base terminal of transistor 164 through coupling capacitor 166, the base-emitter terminals of transistor 170, and resistor 168 to modulate the emitter output signal of the transistor 164. This signal is fed through a diode 171 of the OR gate 160 to the recording amplifier.

The identifying notch is taken from the horizontal sync signal $f_h$ at the beginning of each line of red chrominance signal information (R–Y) by applying the output from the notch signal generator 150 (FIG. 4) to the emitter terminal of transistor 170, whereupon the output from the notch signal generator controls the base bias signal to transistor 164.

Figure 6:
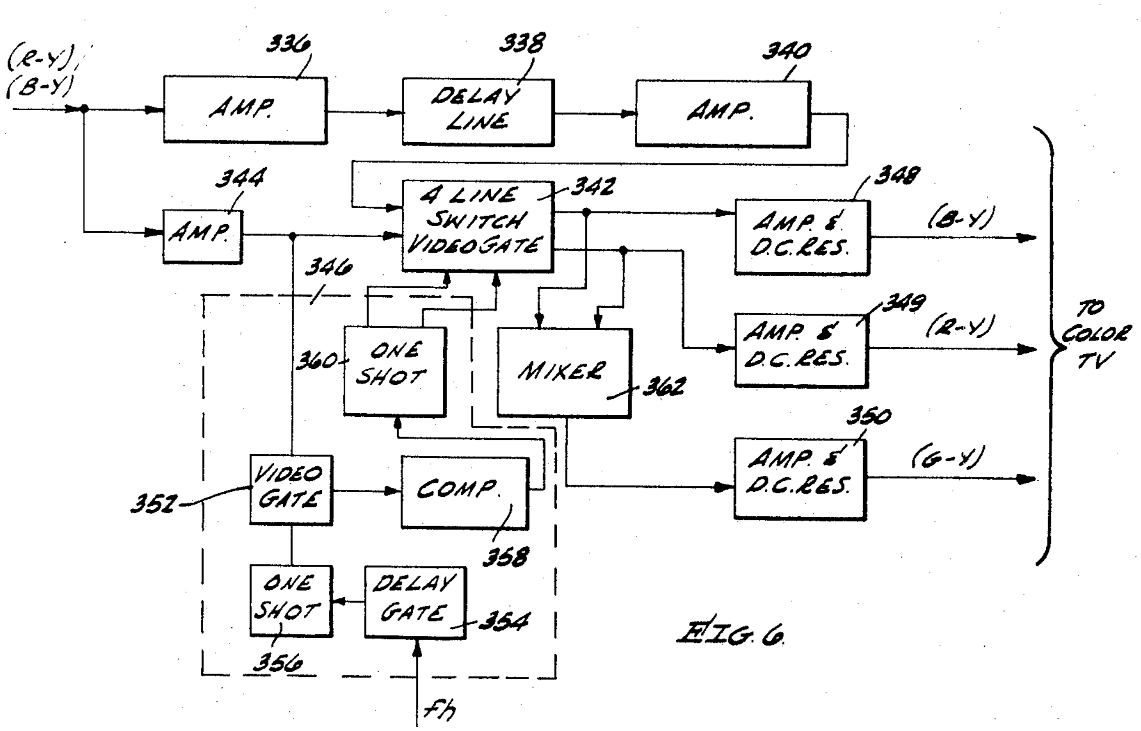
FIG. 6 is a block diagram of the color decoder.

Referring now to the chrominance decoding operation, reference is made to FIG. 6 in which the red signal (R–Y) and the blue signal (B–Y) played back from the recorder 20 are received and divided into two circuit branches.

In the first circuit branch, the red signal (R–Y) and the blue signal (B–Y) are sequentially fed through an amplifier 336 to a delay line 338 which delays the signals for 63.5 microseconds or the duration of one horizontal raster line or horizontal video line. The delayed signals are fed through an amplifier 340 to a four-line switching video gate 342. The delayed signal is utilized at the four-line switching video gate to fill in the color resolution of the played-back chrominance signals and to obtain a green signal (G–Y), as will be explained in more detail shortly.

In the second circuit path, the red signal (R–Y) and the blue signal (B–Y) are sequentially fed through an amplifier 344 to the four-line switching video gate 342. The four-line switching gate is responsive to the operation of a notch detector 346 to insure that the red (R–Y) and the blue (B–Y) chrominance signals are synchronously fed to the proper amplifiers and DC restorers 348 and 349, respectively.

The notch detector 346 includes a video gate 352 which is coupled to receive the amplified red signal (R–Y) and the blue signal (B–Y) to generate an output signal when the notch is detected in the played-back chrominance signal (R–Y)/(B–Y). As previously stated, the played-back red signal (R–Y) has a notch taken out of the horizontal sync pulse. To identify the notch in the red signal (R–Y), the horizontal sync pulse $f_h$ derived from the played-back pilot signal P by synchronizer 18 is applied to a delay generator 354 of the notch detector 346 and then to a one-shot multivibrator 356. The output from the one-shot multivibrator is fed to the video gate 352 wherein, if the notch is present in the red signal (R–Y), a comparator 358 is triggered and generates an output signal that will switch a one-shot multivibrator 360 to a first state for the period of one horizontal video line. As a result, the output of the multivibrator will switch the four-line switching gate to a first operation condition, thereby synchronizing the color switching operation. When, however, the blue signal (B–Y) is being fed through the video gate 352, the one-shot multivibrator 360 has switched back to its stable state, whereby the four-line switching video gate 342 is in a second operating condition.

The output from the four-line switching video gate 342 is such that with the delayed color signals (R–Y)/(B–Y) and the directly received color signals (R–Y)/(B–Y), the blue signal (B–Y) is always fed to the amplifier and DC restorer 348, the red signal (R–Y) is always fed to the amplifier and DC restorer 349, and the blue signal (B–Y) and the red signal (R–Y) outputs from the four-line switching video gate are always fed to the correct inputs of a mixer 362 where they are mixed together to obtain a green signal (G–Y) which is fed to an amplifier and DC restorer 360.

Figure 7:
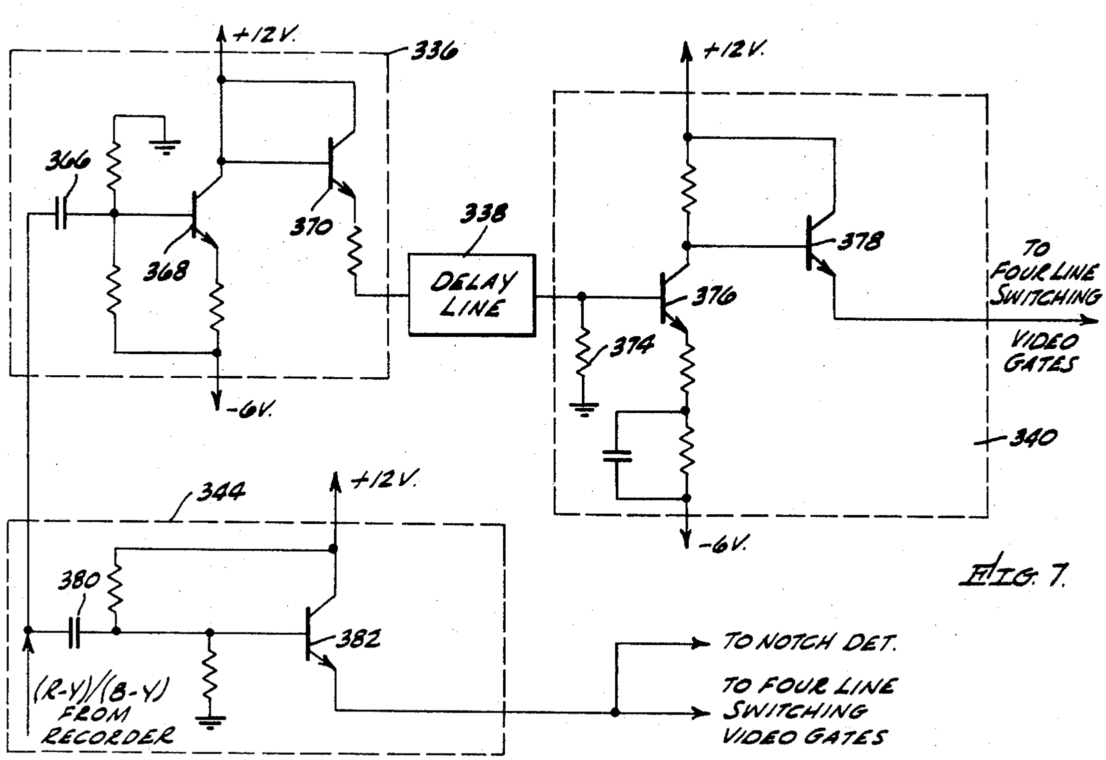
FIG. 7 is a schematic diagram of the parallel amplifier and delay channels preceding the four-line video gate in the decoder of FIG. 6.

Referring now to the details of the decoder, reference is made to the circuit of FIG. 7, in which the red signal and the blue signal (R–Y)/(B–Y) received from the tape recorder 20 are fed in an alternating sequence through a coupling capacitor 366 to the base terminal of a transistor 368 within the amplifier 336 of the first circuit path. The base bias of transistor 368 results in variations in the collector current which further result in changes in the signal level at the collector terminal thereof. The collector terminal signal is fed to base bias a second stage transistor 370. The base bias of the second stage transistor 370 results in variations in the emitter current signal which is fed through a resistor 372 to the delay line 338.

The delay line 338 receives the chrominance signals (R–Y)/(B–) from the amplifier 336 and delays them for one horizontal raster line time interval. One type of delay line circuit that will perform this operation is a lumped constant delay line which has a time delay of about 63.5 microseconds. The delayed chrominance signals (R–Y)/(B–Y) are fed sequentially to the amplifier 340.

The amplifier 340 includes a load resistor 374 which is connected to receive the delayed chrominance signal (R–Y)/(B–) at one end and is connected to a ground reference terminal at the other end. The voltage signal developed across resistor 374 is fed to base bias transistor 376. The base bias results in a variation in the collector current of transistor 376 which results in a sympathetic variation in the voltage level of the collector terminal signal. The collector terminal signal is fed to base bias a second stage transistor 378, thereby causing a sympathetic variation in the emitter current flow thereof. This emitter current output signal from transistor 378 is fed from the amplifier 340 to one input of the four-line switching video gate 342.

In addition to the delayed chrominance signals (R–Y)/(B–Y) fed to the four-line switching video gate 342, the chrominance signals (R–Y)/(B–Y) are fed directly to the four-line switching video gate 342 through the amplifier 344 in a second circuit path and to a notch detector circuit 346.

The amplifier 344 includes a coupling capacitor 380 which passes the sequentially received red signal (R–Y) and blue signal (B–Y) to the base terminal of a transistor 382. The color signals (R–Y)/ (B–Y) base bias the transistor 382 thereby causing a sympathetic variation in the emitter current. The emitter current signal is fed from the amplifier 344 to a second input terminal of the four-line switching video gate 342, as illustrated in FIG. 6.

In operation, the four-line switching video gate 342 is responsive to the output from the notch detector 346 to insure that first the directly received blue signal (B–Y) and then the delayed blue signal (B–Y) are always conducted in synchronized sequence to one output terminal and that first the directly received red signal (R–Y) and then the delayed red signal (R–Y) are always conducted in sequence to a second output terminal.

Figure 8:
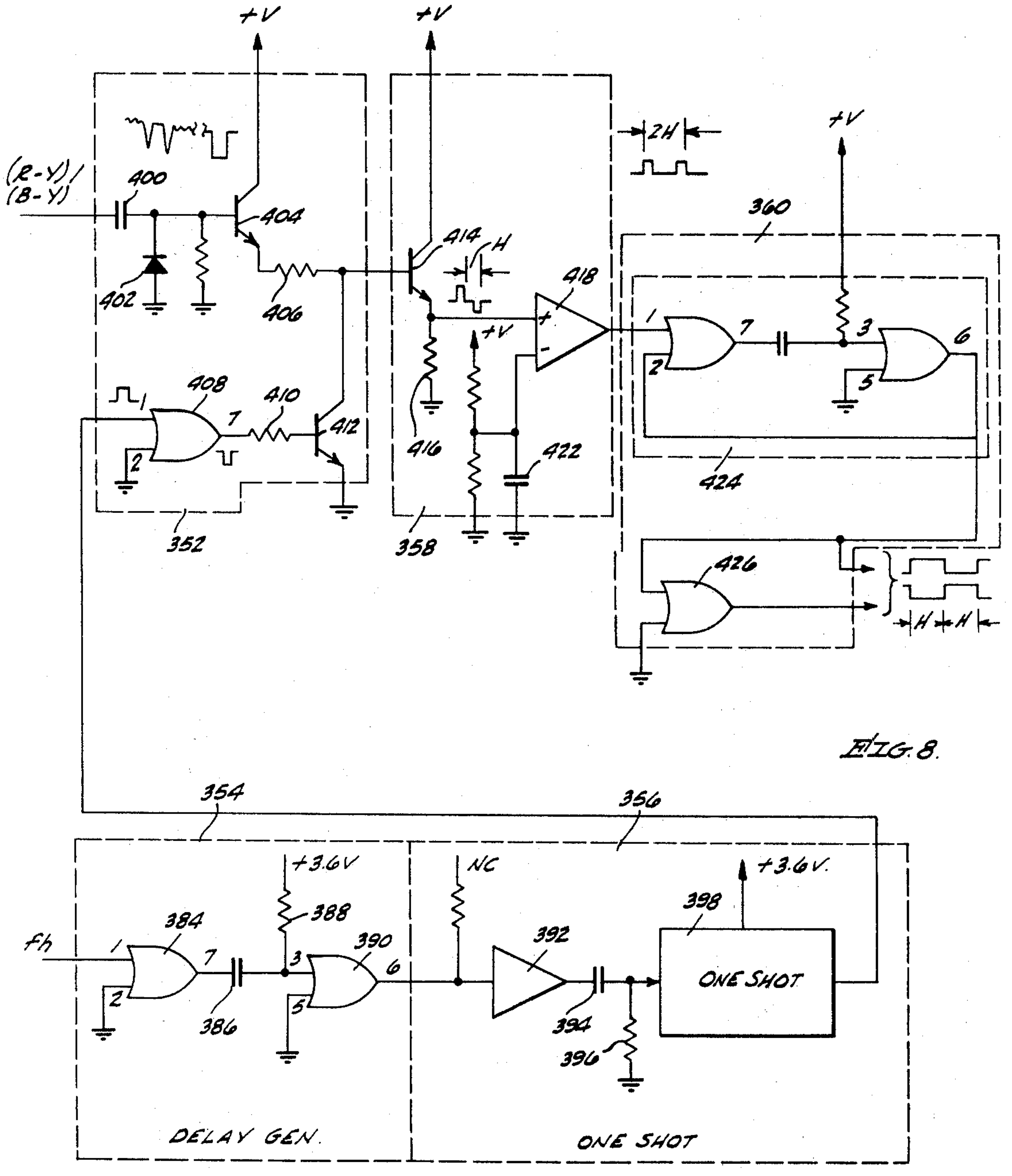
FIG. 8 is a schematic diagram of the notch detector portion of the decoder of FIG. 6.

Referring now to the details of the notch detector circuit 346, illustrated in FIG. 8, the horizontal sync signal $f_h$ received from the synchronizer 18, is fed to a delay generator 354 which is operable to generate a change in the output pulse after a predetermined time delay. The delay generator 354 is constructed from the previously referenced "μL–914" with a first stage amplifier 384 coupled to receive the horizontal sync signal $f_h$ and to generate an output pulse which is fed through an RC timing circuit including a series capacitor 386 and a shunting resistor 388 which have an RC time constant sufficient to delay the desired triggering of a second stage amplifier 390. When amplifier 390 is triggered, a time-delayed pulse signal is generated which is fed to the one-shot multivibrator 356.

The one-shot multivibrator includes an amplifier stage 392, such as a "μL–900," manufactured by the Fairchild Semiconductor Co., and described and illustrated in their publication SL–66 dated Aug. 1965, which is coupled to receive the signal from the delay generator 354. The amplifier output signal is fed through a differentiator including a series capacitor 394 and a shunting resistor 396 to a one-shot multivibrator 398 of the previously described type. The time-delayed output pulse from the one-shot multivibrator 398 is fed to video gate 352.

The video gate 352 sequentially receives the red signal and then the blue signal (R–Y)/(B–Y) from the amplifier 344 illustrated in FIG. 7, and receives the delayed pulse from the one-shot multivibrator 356 to generate output pulses which are positive if the notch is present in the played-back horizontal sync signal $f_h$, and a negative pulse signal if the played-back horizontal sync signal does not have a notch taken from it. Thus, since only the horizontal sync signal $f_h$ preceding the red signal (R–Y) has a notch taken out of it, only the red signal generates a positive output pulse. To effect this operation, the delayed output pulse from the one-shot multivibrator 356 has a short duration relative to the duration of the played-back horizontal sync signal $f_h$ and the notch. Thus, assuming that the played-back color signal (R–Y)/(B–Y) having the notch removed is fed to the video gate 352 through a coupling capacitor 400 and past a diode clamp 402 to base bias a transistor 404, the base bias to transistor 404 results in a sympathetic variation in the emitter current which is fed through a resistor 406 and to the comparator 358. The pulse synchronized with, but delayed from the horizontal sync signal is fed to an amplifier 408, such as a previously referenced "μL–" and causes a negative output pulse which is fed through a resistor 410 to base bias a switching transistor 412. The transistor 412 is normally on and is turned off by the output pulse from the amplifier 408. Since the delayed pulse has a relatively short duration and is synchronized to fall well within the notch interval in the played-back horizontal sync signal $f_h$, the signal applied to the comparator 358 is a positive-going pulse. If, however, the played-back horizontal sync signal $f_h$ h does not have a notch taken out of it, the emitter current signal of transistor 404 is sufficient to cause a negative-going pulse signal to be applied to the comparator 358.

The comparator 358 generates a positive-going output pulse only when the input signal exceeds a threshold level. Structurally, the comparator 358 includes a transistor 414 which is coupled to receive the positive-going and negative-going output pulses from the video gate 352 at its base terminal. These pulses base bias the transistor 414 resulting in a sympathetic variation in the emitter current which flows through an emitter follower resistor 416. This results in variations in the emitter voltage signal which is applied to a comparator circuit 418, such as a "μA–710," "High-speed Differential Comparator," manufactured by Fairchild Semiconductor Co., and described and illustrated in their corresponding brochure dated Mar. 1965. A threshold level of the comparator amplifier 418 is set at the tap point of a voltage divider 420 and causes a voltage buildup across a storage capacitor 422. In operation, when the amplitude of the input pulse exceeds the threshold level, a positive pulse is generated. Thus, only positive pulses are generated and occur once every two horizontal raster scan line intervals and are fed to the one-shot multivibrator.

The one-shot multivibrator 360 includes a one-shot multivibrator circuit 424 of the previously described type, which is adjusted to generate an output pulse having a duration equal to one horizontal raster scan time interval, or 63.5 microseconds. Thus, the output pulse from the one-shot multivibrator will go positive for one horizontal raster scan line interval, and negative for the next horizontal raster scan line time interval. Two 180° out-of-phase pulse trains are obtained from this pulse by feeding the output pulses to a first circuit branch which has an inverter amplifier 426 which inverts the sense of the signal, and to a second circuit branch, which does not affect the sense of the signal. These two pulse trains are fed in parallel to the four-line switching video gate 342, illustrated in FIG. 9.

Figure 9:
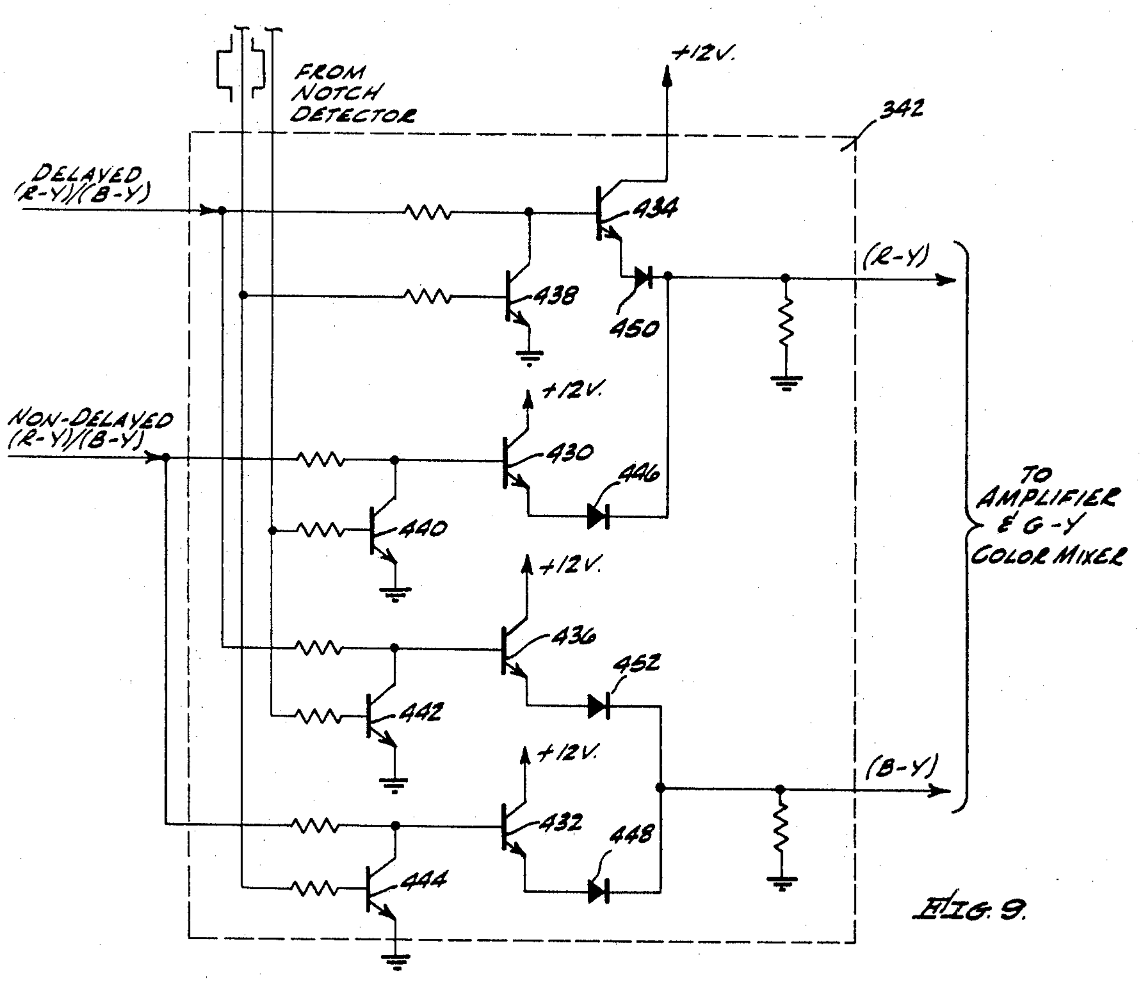
FIG. 9 is a schematic diagram of the four-line switching video gate of the decoder of FIG. 6.

Referring now to the details of the four-line switching video gate 422, illustrated in FIG. 9, the played-back red signal (R–Y) and the blue signal (B–Y) and the delayed red signal (R–Y) and the delayed blue signal (B–Y) are processed in response to the complementary pulse train signals from the one-shot multivibrator 360 of the notch detector 346 so that the nondelayed and then the delayed red signals (R–Y) are sequentially played out on the red channel and the nondelayed and then the delayed blue signals (B–Y) are sequentially plated out on the blue channel.

More specifically, the nondelayed red color signal (R–Y) and then the blue color signal (B–Y) from the amplifier 344 (FIG. 7) are sequentially fed to the base terminal of transistor 430 in the red channel, and fed to the base terminal of transistor 432 in the parallel blue channel. In addition, the delayed red color signal (R–Y) and then the delayed blue color signal (B–Y) from the amplifier 340 (FIG. 7) is fed to the base terminal of a transistor 436 in the blue channel. In order to process the played-back color information so that only the nondelayed and the delayed red signals (R–Y) are sequentially plated out from the red channel and the nondelayed and the delayed blue signals (B–Y) are played out from the blue channel, the 180° out-of-phase pulse trains from the notch detector 346 are fed to base bias shorting transistors 438, 440, 442, and 444 on and off on a line-by-line basis for this particular embodiment. Structurally, the shorting transistors 438–444 have their collector terminals connected to the base terminal of the transistors 430–436, and their emitter terminals coupled to a ground reference terminal so that when they are turned on, they shunt or short the color signals being fed to the base terminals of the transistors 430–436 to ground. Thus, assume that during an arbitrarily selected first line time interval, illustrated in FIG. 2c, the directly received red signal $(R–Y)_1$ is fed to the base terminal of transistor 430 in the red channel and to the base terminal of transistor 432 in the blue channel. The sense of the pulse trains received from the notch detector circuit is such that shorting transistor 440 in the red channel is turned off, thereby enabling the red signal $(R–Y)_1$ to base bias transistor 430. This results in a sympathetic emitter current flow through an isolating diode 446 and a red output signal $(R–Y)_1$ for the first horizontal raster scan line, as illustrated in the graph of FIG. 2c. During this time interval, the shorting transistor 444 in the blue channel is turned on to short the red signal (R–Y) to the ground terminal. During the next horizontal video line time interval, the blue signal $(B–Y)_3$ from the amplifier 344 is fed to the base terminals of transistor 430 and 432 in the red channel and blue channel, respectively. However, during this time interval, the sense of the pulse trains from the notch detector are such that shunting transistor 440 is turned on and shunting transistor 444 is turned off, whereby the blue signal $(B–Y)_3$ base biases the transistor 432 in the blue channel. This base bias results in an emitter current flow through an isolating diode 448, and results in a blue output signal $(B–Y)_3$. During this same horizontal raster scan line time intervals, the delayed red signal $(R–Y)_1$ is received from the amplifier 340 and fed to the base terminal of transistor 434 in the red channel and the base terminal of transistor 436 in the blue channel. The 180° out-of-phase pulse trains from the notch detector are such that shunting transistor 438 is turned off and shunting transistor 442 is turned on. As a result, the delayed red signal $(R–Y)_1$ base biases transistor 434 in the red channel but does not base bias transistor 436 in the blue channel. This results in a sympathetic emitter current flow through the diode 450 which results in a red output signal $(R–Y)_1$ in the red channel which has been delayed one line.

During the next or third sequential horizontal raster scan line time interval (line 5), the output signals from the notch detector are operable so that the states of shunting transistors 438–444 are such that a red signal $(R–Y)_5$ is played back through the diode 446 and the delayed blue signal $(B–Y)_3$ is played back through the diode 452.

The outputs from the four-line switching color gates are fed in parallel to the amplifiers and DC restorers 348 and 349, respectively, and to a mixer 362 where they are added together to reconstruct the green color signal $(G–Y)_1$, all three color signals being in time-base synchronism with one another.

Figure 10:
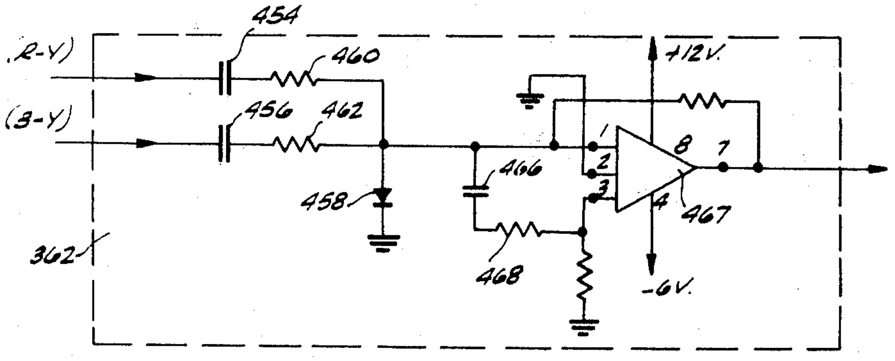
FIG. 10 is a schematic diagram of the mixer of the decoder of FiG. 6.

Referring now to the details of the mixer 362, reference is made to FIG. 10 in which the nondelayed and delayed red signals (R–Y) and the delayed and nondelayed blue signals (B–Y) are received in parallel, wherein they are summed together in accordance with gain constants to produce a resultant green color signal (G–Y). For example, as illustrated in FIG. 2c, during the third horizontal line, the delayed red signal $(R–Y)_1$ and the blue signal $(B–Y)_3$ are received on the parallel circuit branches including the coupling capacitors 454 and 456, respectively, and are summed at the junction of a clamping diode 458 through resistors 460 and 462, respectively. During the next horizontal video line the nondelayed red signal $(R–Y)_5$ and the delayed blue signal $(B–Y)_3$ are received in parallel and are summed accordingly. Thereafter, this sequence is continually repeated line-by-line. The summed signal is fed directly to one input of an operational amplifier 464 and through a stabilizing capacitor 466 and resistor 468 to a second input of amplifier 464. The two input signals are amplified in accordance with the gain factor of the operational amplifier 464 and summed together to obtain the green color signal (G–Y) where $$[(G-Y)=-(K_1(R-Y)+K_2(B-Y))]$$

This green signal (G–Y) is utilized to modulate the beam of a color cathode ray tube at the receiver 12. One amplifier 464 that will perform this operation is a "$\mu$A–702C," "High Gain Wide Band DC Amplifier," manufactured by the Fairchild Semiconductor Co. and described and illustrated in their brochure SL–45 dated July 1965.

As illustrated in FIG. 6, the played-back blue signal (B–Y), the played-back red signal (R–Y), and the played-back green signal (G–Y) are fed through the amplifiers 348, 349 and 350, respectively, to the color television receiver (FIG. 1).

While the salient features have been illustrated and described with respect to a particular embodiment, it should be readily apparent that modifications can be made within the spirit and scope of the invention, and it is therefore not desired to limit the invention to the exact details shown and described.

I claim:

1. In a television signal processing system of the type in which two of three color signals are selectively switched on a line-by-line basis and received directly on a first input channel means, wherein both of the switch color signals are preceded by horizontal sync signals, the horizontal sync signals associated with one of the switch color signals having an identifying waveform thereon, having a generated pilot signal, and second input channel means for delaying the switched color signals for the duration of one horizontal video line wherein the improvement comprises:

detector means coupled to receive the nondelayed selectively switched color signals directly from the first input channel means and the pilot signal for detecting coincidence between the identifying waveform and the pilot signal and including a one-shot multivibrator coupled for generating in response thereto an output signal having a duration equal to about the time of one horizontal video line;

means including a switch having a plurality of outputs, said switch being coupled to receive the nondelayed and delayed selectively switched color signals from the first and second input channel means and being responsive to the output signal from said detector means for processing the received color signals is always fed to one of said plurality of outputs in response thereto, and the other color signal is always fed to a second one of said plurality of outputs when no output signal is received; and mixer means coupled to receive combinations of the first color signal and the second color signal from said outputs of said switch for combining them and feeding them to another output for producing a third color signal.

2. A television signal processing system of claim 1 in which the identifying waveform is pulse positioned between the leading edge and trailing edge of the horizontal sync signal and said detector means further includes means responsive to the leading edge of the pilot signal for producing a narrow pulse relative to the duration of the horizontal sync signals having a time delay substantially corresponding to the pulse position of the identifying waveform whereupon the detector means is operable to detect coincidence therebetween.